United States Patent
Schulz

[11] Patent Number: 5,259,008
[45] Date of Patent: Nov. 2, 1993

[54] STAGED DEPRESSURIZATION SYSTEM

[75] Inventor: Terry L. Schulz, Murrysville Boro, Westmoreland County, Pa.

[73] Assignee: Westinghouse Electric Corp., Pittsburgh, Pa.

[21] Appl. No.: 903,413

[22] Filed: Jun. 24, 1992

[51] Int. Cl.⁵ .......................................... G21C 9/004
[52] U.S. Cl. .................................................. 376/283
[58] Field of Search ............... 376/282, 283, 299, 277

[56] References Cited

U.S. PATENT DOCUMENTS

| | | |
|---|---|---|
| 4,753,771 | 6/1988 | Conway et al. ............... 376/283 |
| 5,180,543 | 1/1993 | Conway et al. ............... 376/282 |

Primary Examiner—Daniel D. Wasil
Attorney, Agent, or Firm—J. C. Valentine

[57] ABSTRACT

A nuclear reactor having a reactor vessel disposed in a containment shell is depressurized in stages using depressurizer valves coupled in fluid communication with the coolant circuit. At least one sparger submerged in the in-containment refueling water storage tank which can be drained into the containment sump communicates between one or more of the valves and an inside of the containment shell. The depressurizer valves are opened in stages, preferably at progressively lower coolant levels and for opening progressively larger flowpaths to effect depressurization through a number of the valves in parallel. The valves can be associated with a pressurizer tank in the containment shell, coupled to a coolant outlet of the reactor. At least one depressurization valve stage openable at a lowest pressure is coupled directly between the coolant circuit and the containment shell. The reactor is disposed in the open sump in the containment shell, and a further valve couples the open sump to a conduit coupling the refueling water storage tank to the coolant circuit for adding water to the coolant circuit, whereby water in the containment shell can be added to the reactor from the open sump.

22 Claims, 4 Drawing Sheets

STAGED DEPRESSURIZATION SYSTEM

GOVERNMENT CONTRACT

The Government of the United States of America has rights in this invention pursuant to Contract No. DE-AC03-9OSF18495 awarded by the Department of Energy.

BACKGROUND OF THE INVENTION

The invention relates to a system which can decrease the pressure in a pressurized water nuclear reactor so that additional coolant can be added at low pressure. More particularly, the invention provides a system of valve connections to spargers opening flowpaths between a hot leg of the primary reactor coolant circuit and the in-containment refueling water storage tank. The valve system is operable in stages for quickly reducing the pressure without sudden hydraulic loading of the respective reactor conduits.

Depressurization systems comprising sparger vents are used in boiling water reactors, for over-pressure protection and so that coolant can be added using a low pressure pump rather than a high pressure pump. When commencing depressurization, one or more valves coupling the coolant circuit to spargers are simply opened. The spargers comprise conduits with small jet orifices submerged in a tank of water, for example at atmospheric pressure. When the valve(s) are opened, steam is emitted from the sparger orifices into the tank, and coolant condenses in the water, with consequent reduction of pressure in the coolant circuit.

In conventional depressurization of a boiling water reactor, the object is not to reduce the coolant pressure to atmospheric pressure, but only to reduce the pressure to the point where pumps are effective to inject water into the coolant circuit. The spargers are intended to reduce the pressure to around 100 to 200 psi, to allow injection of water from a relatively low pressure pump.

A pressurized water reactor operates at substantial coolant pressure. The temperature of the coolant in a pressurized water reactor having even a modest power level may be on the order of 600° F. (330° C.). The operational coolant pressure in the reactor vessel may be 2,250 psi (150 bar).

It may be desirable to add water to the coolant circuit of a reactor in various circumstances. When operational, the level of coolant may be lowered slightly due to leakage through designed means such as pressure reliefs, or due to leakage through a small opening in the coolant circuit which does not represent a critical defect, eventually requiring that coolant be added. In a severe loss of coolant accident, a substantial break in the coolant circuit can flush a large quantity of coolant into the containment shell. A depressurization system should respond appropriately to any eventuality, enabling sufficient coolant to be added to comply with the ultimate requirement to cool the nuclear fuel.

Where the connections between a coolant circuit or tank at high pressure and a low pressure outlet such as a sparger are made suddenly, a severe thermal and hydraulic load is placed on the conduits and on the coolant circuit as a whole. Moreover, the initial coupling of the coolant circuit with the pressure relieving spargers results in a substantial loss of coolant driven by the very high pressure differential between the coolant in the circuit and the outlets (i.e., the sparger orifices). For both these reasons, there is a potential for damage to the reactor during depressurization. Apart from the possibility of causing faults in the conduits due to thermal and hydraulic stress, the loss of coolant results in an increased danger that the remaining coolant may be insufficient to maintain cooling of the nuclear fuel. There is a need for a depressurization system which minimizes stress and conserves coolant, by a more gradual opening of flow to the pressure relief.

It is desirable in a nuclear reactor safety system also to minimize reliance on active elements such as pumps. U.S. Pat. No. 4,753,771 —Conway et al discloses a safety system which employs high pressure and low pressure supplies of makeup water for addition to the coolant. The low pressure supply has a tank at atmospheric pressure (i.e., at the pressure within the containment shell) and is arranged in the containment at an elevation above the coolant circuit, coupled to the coolant circuit via a check valve. A high pressure makeup tank provides water for a short time in the event of a leak, without depressurization. Some time during the depletion of the high pressure water supply, it is necessary to depressurize the reactor coolant system to allow the much larger amount of water available from the low pressure supply to be added. This addition occurs at a relatively low positive pressure (due to the fluid pressure head of the storage tank) or even at atmospheric pressure.

According to the Westinghouse Electric Corporation AP600 reactor design, of which the present invention is a part, a high pressure makeup tank is provided with about 20 minutes of water supply. After depressurization of the coolant circuit in an emergency situation, a gravity drain tank at atmospheric pressure in the containment shell provides approximately ten hours of water supply. When the gravity drain tank is emptied into the containment shell, the containment is filled to a point where recirculation of water condensing on inner walls of the containment becomes possible. The gravity tank holds sufficient water that when the tank empties into the containment, the height of the water in the containment provides a sufficient fluid pressure head to force water into the reactor (located low in the containment). The water boils in the reactor and thereby cools the core. The depressurization system vents the steam from the boiling water into the containment shell. The steam condenses on the inner walls of the containment and returns as water to cool the reactor.

The depressurization occurs in stages. Initially, relatively smaller conduits leading to submerged spargers are opened by valves. Relatively larger conduits are then opened by further valves, the larger conduits also leading to spargers. Ultimately, in a final stage, the coolant system is vented directly into the containment.

SUMMARY OF THE INVENTION

It is an object of the invention to provide a depressurization system for a nuclear reactor wherein the pressure can be reduced promptly, without producing severe thermal and hydraulic loads.

It is also an object of the invention to conserve the available coolant in a reactor coolant circuit.

It is another object of the invention to provide a series of stage-operated valves for depressurizing a nuclear reactor, and in particular to provide staged valves along a range of progressively larger and/or more direct flowpaths, especially having a range of conduit diameters and/or orifice sizes for progressively increasing the coupling of the coolant circuit to the spargers as the pressure drops.

It is a further object of the invention to provide staged valves wherein the final stage couples a hot leg of the coolant circuit to the containment shell, for efficiently venting steam in the coolant close to where the coolant was heated by the nuclear fuel.

These and other objects are accomplished in a nuclear reactor having a reactor vessel disposed in a containment shell, depressurized in stages using depressurizer valves coupled in fluid communication with the coolant circuit. At least one sparger submerged in the in-containment refueling water storage tank which can be drained into the containment sump communicates between one or more of the valves and an inside of the containment shell. The depressurizer valves are opened in stages, preferably at progressively lower pressures and for opening progressively larger flowpaths to effect depressurization through a number of the valves in parallel. The decreasing pressure levels can be sensed by monitoring the level of coolant in the high pressure makeup tank, and used to operate the staged valves. The valves can be associated with a pressurizer tank in the containment shell, coupled to a coolant outlet of the reactor. At least one depressurization valve openable at a lowest pressure is coupled directly between the coolant circuit and the containment shell directly. The reactor vessel is disposed in the open sump in the containment shell, and a further valve couples the open sump to a conduit coupling the refueling water storage tank to the coolant circuit for adding water to the coolant circuit, whereby water in the containment shell can be added from the open sump.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
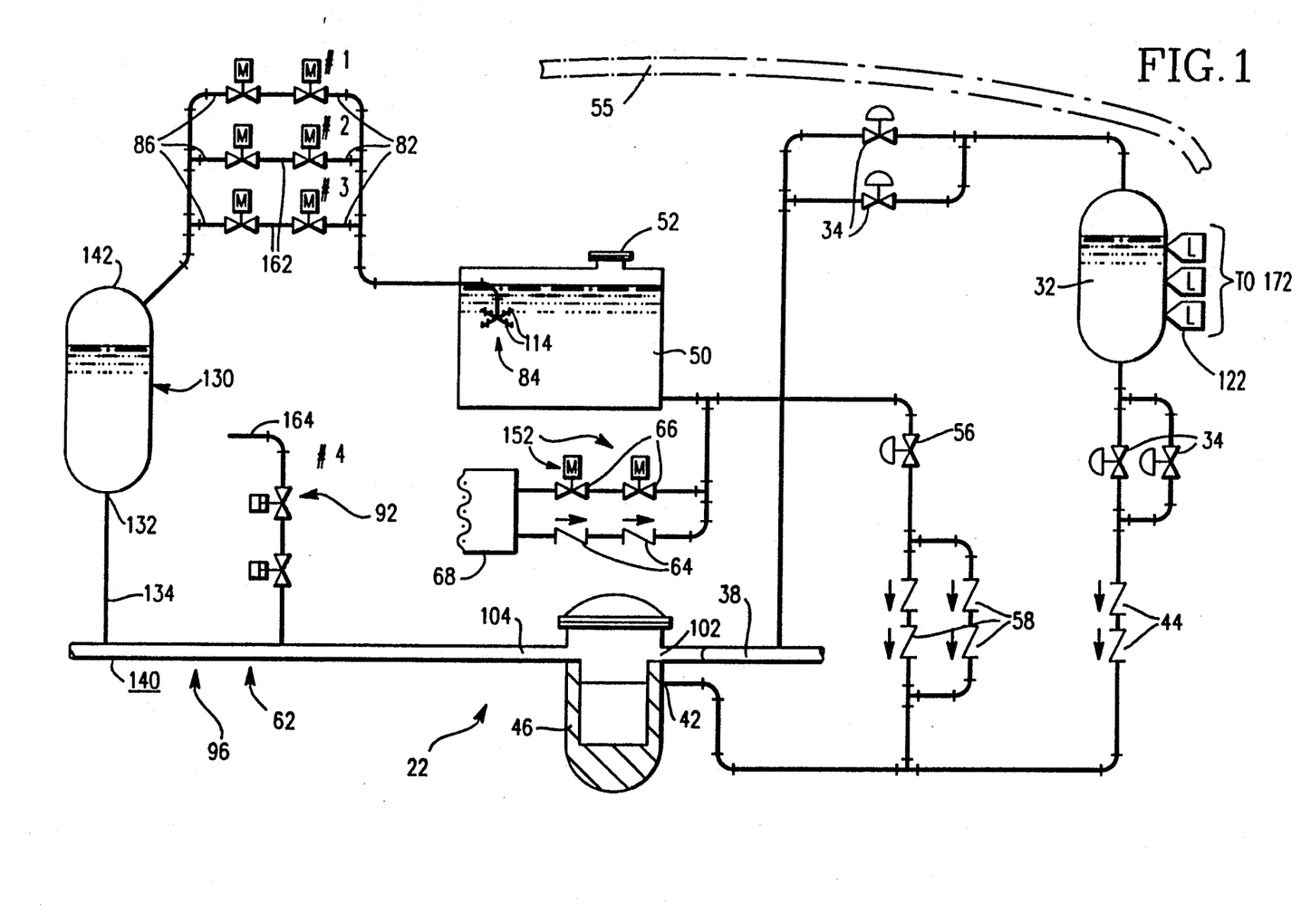
FIG. 1 is a schematic diagram illustrating a nuclear reactor with a staged depressurization system according to the invention.

In FIG. 1, there are two sources of coolant to make up for losses of coolant in the nuclear reactor 22. A high pressure make up tank 32 is coupled by valves 34 between the coolant inlet or cold leg 38 and a reactor vessel injection inlet 42. However, the volume of the high pressure make up tank 32 is limited. A much larger quantity of coolant water is available from the in-containment refueling water storage tank (IRWST) 50, at atmospheric pressure due to vent 52, which opens from tank 50 into the interior of the containment shell 55. A valve 56 and a series of check valves 58 are provided for draining water from the refueling water storage tank 50 to the coolant circuit 62. Additional check valves and/or motor operated valves 64 are provided for recovering water from a sump 68 located inside the containment. However, these valves 58, 64 require that the reactor be fully depressurized in order to allow injection of coolant.

Figure 2:
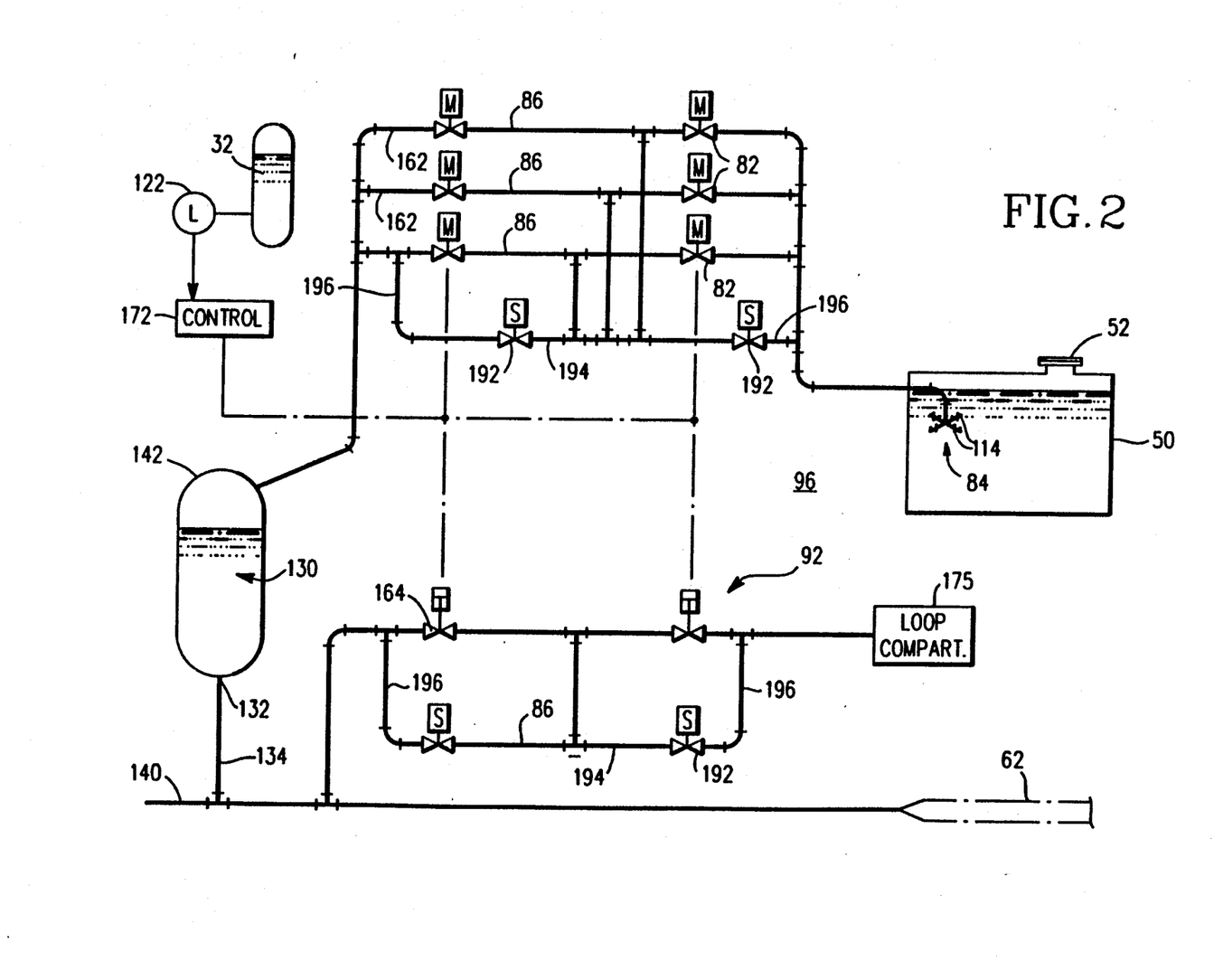
FIG. 2 is a schematic diagram illustrating the depressurization, system in more detail.

According to the embodiment of the invention shown in FIGS. 1 and 2, a nuclear reactor 22 is depressurized by venting the coolant circuit into the containment shell 55 in a number of stages of decreasing pressure. For example, three initial stages are achieved by opening valves 82 coupled via spargers 84 between the coolant circuit 62 and the interior of the containment shell 55, the respective valves 82 in each leg being opened at successively lower levels of the high pressure makeup tank 122 and preferably being coupled in parallel legs along conduits 86, which are progressively larger for the successive stages. A final stage of depressurization is achieved by opening a valve means 92 which couples the coolant circuit 62 directly into the containment shell 55. The goal is to reduce the pressure to atmospheric pressure as quickly as practicable, whereupon coolant can be added to the coolant circuit by gravity feed at ambient pressure in the containment 55, while preventing severe thermal and hydraulic loads, undue loss of coolant, and other dangerous effects. Preferably, in each case, two serial valves are provided for each valve means along a respective conduit leg, as redundant shutoff means for safety purposes. Such valves are normally intended to be operated simultaneously, and accordingly such valve pairs or sets are described herein simply as valves.

Staged depressurization helps to reduce thermal and hydraulic loading. It also makes inadvertent use of the depressurization system 96 less severe. A relatively small depressurization flowpath is opened initially, and the flowpath is enlarged in stages. This is accomplished by opening successively larger flowpaths upon reaching decreased pressure setpoints, and also can be accomplished by timed opening of the valves 82, 92 for individual flowpaths.

Figure 3:
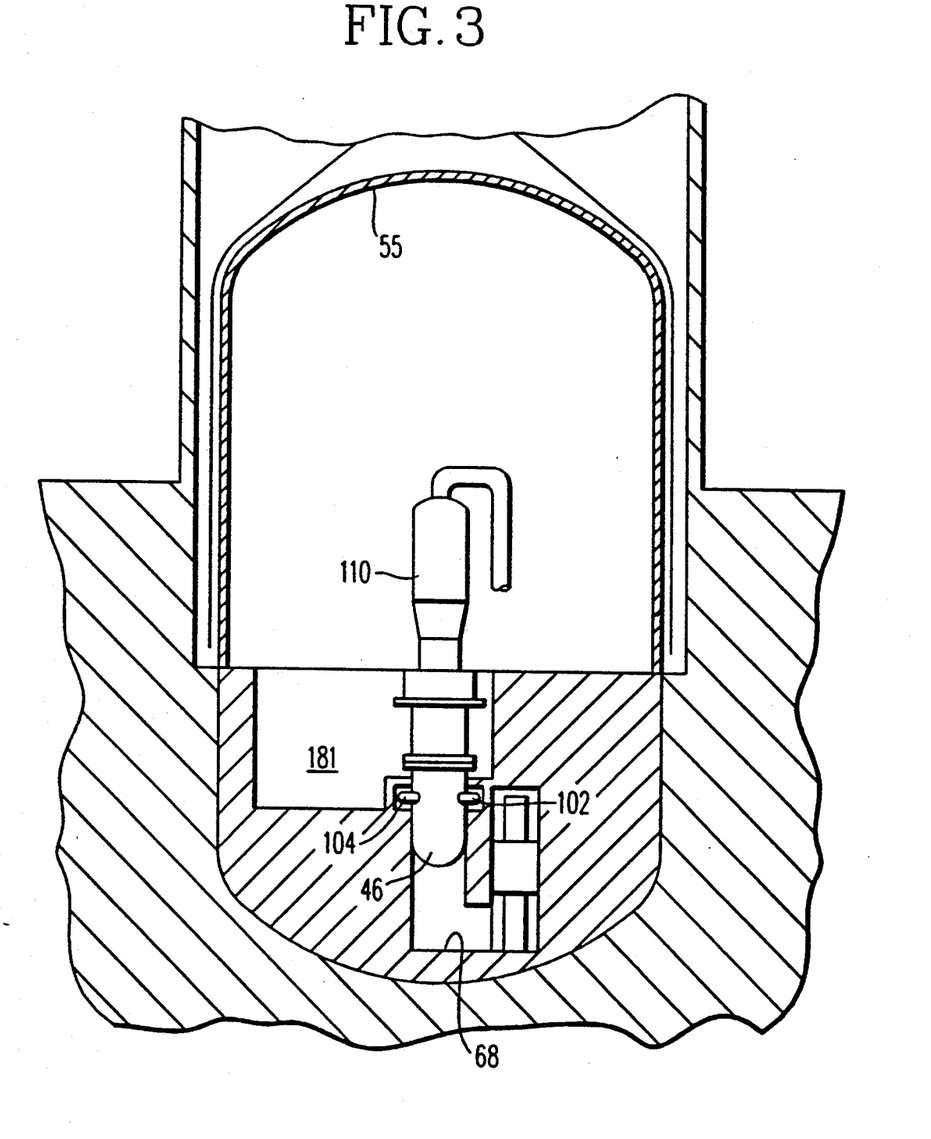
FIG. 3 is a vertical section view through a nuclear reactor facility, showing the reactor vessel and water tanks.
Figure 4:
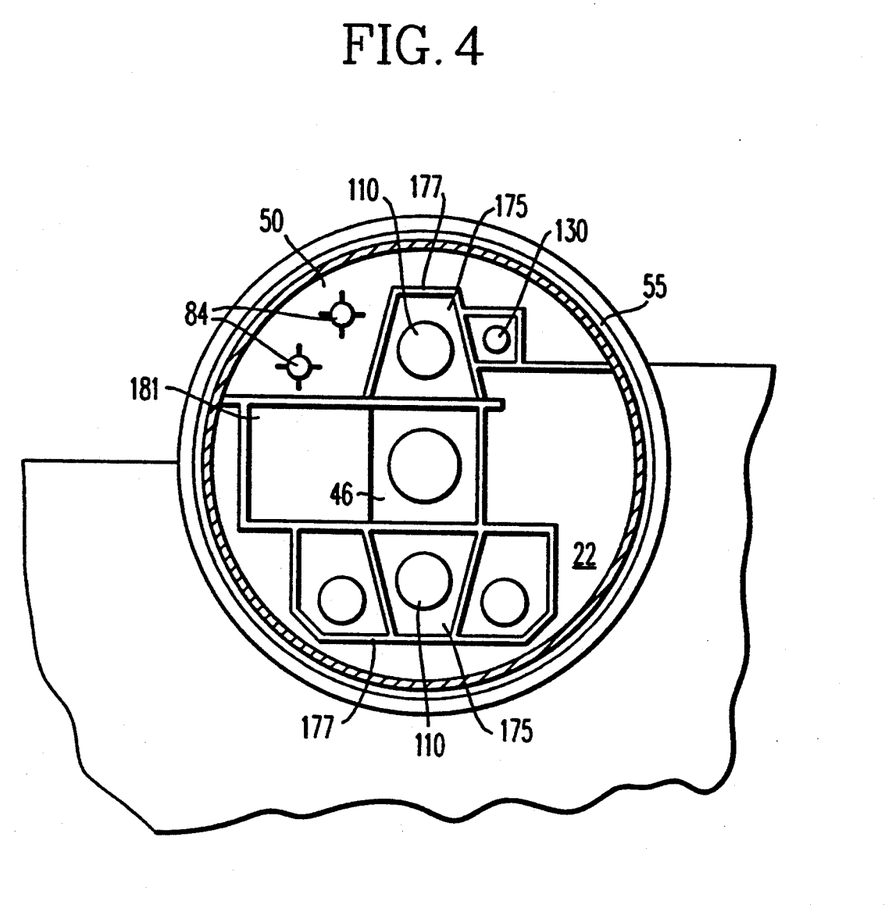
FIG. 4 is a sectional plan view of the reactor facility according to FIG. 3.

FIGS. 1 and 2 are schematic representations of the depressurization system 96 and the reactor 22, and FIGS. 3 and 4 are physical representations. The same reference numerals have been used in all the figures to identify corresponding elements.

The depressurization system 96 reduces the pressure in a nuclear reactor 22 having a reactor vessel 46 disposed in a containment shell 55 and inlet piping 102 and outlet piping 104 coupled to the reactor vessel 46. At least one steam generator 110 is coupled between the outlet 104 and the inlet 102 for extracting useful power, typically driving an electrical generator. The reactor vessel 46, inlet/outlet conduits 102, 104 and steam generator connections together define a recirculating coolant path or circuit in which water heated by the nuclear fuel is circulated under pressure.

A plurality of depressurizer valves 82, 92 are coupled in fluid communication with the coolant circuit 62 and at least one sparger 84 in fluid communication with an inside of the containment shell 55. The valves 82, 92 are provided with control means and/or operators for successively opening the depressurizer valves 82, 92 to effect depressurization. As additional valves or groups of valves open in stages, the coupling between the coolant circuit 62 and the inside of the containment shell 55 is increased. At the same time, the pressure in the coolant circuit 62 decreases. The depressurizer valves 82, 92 can be successively opened on actuation signals from pressure responsive valve controls or, preferably, via level responsive controls including sensors 122 associated with the high pressure makeup tank and arranged such that each successive one or each successive group of depressurizer valves 82, 92 opens at a progressively lower level setpoint.

Preferably, a pressurizer tank 130 is disposed in the containment shell 55, the pressurizer tank 130 having a bottom head 132 coupled by a conduit 134 to a coolant outlet 140 of the reactor, also referred to herein as the hot leg of the coolant circuit 62. A top head 142 of the pressurizer tank 130 is coupled to at least one of the depressurizer valves 82. The depressurization valves 82 for the higher level opening stages, as shown in FIG. 1, are coupled to the inside of the containment shell 55 through a sparger 84, i.e., a fluid outlet opening at a submerged point in a water tank. The sparger has a series of holes 114 submerged in a tank of water 50, namely the in-containment refueling water storage tank. Tank 50 is vented to the inside of the containment shell 55, i.e., the tank 50 can be at atmospheric pressure. Preferably, the tank 50 is arranged by suitable valving 152 to empty via gravity into one or more of the reactor vessel 46, the coolant circuit 62 and/or the sump 68 in the bottom of the containment shell 55, thereby to cool the core in the event of an accident such as a loss of coolant accident. Inasmuch as the depressurization valves 82 for the higher level stages vent into the refueling water storage tank 50 and the tank 50 vents into the containment shell 55, the pressure of the reactor coolant circuit 62 is vented through to the containment shell 55 in this arrangement.

The depressurization valves 82, 92 are coupled to the containment shell 55 via conduits 162, 164 which are progressively larger for depressurization valves 82, 92 opening at progressively lower pressures. Therefore, not only is the coupling between the coolant circuit 62 and the containment shell 55 increased due to additional conduits 162, 164 opening as pressure in the coolant circuit 62 decreases. Furthermore, the size of the flowpath for a given opening stage is larger than the flow path opening of the previously opening stage. The result is a gradual but expeditious decrease in coolant pressure. To render the change more gradual, the depressurization valves 82, 92 can be motor operated or otherwise arranged to open from fully closed to fully open over a period of time, whereby peak flows through the depressurization valves 82, 92 are limited.

At least one of the depressurization valves 92 or group of valves 92 defines the last stage of depressurization, i.e., this valve or group is openable at a lowest level of the high pressure makeup tank. Valve(s) 92 couple directly between the coolant circuit 62 and the containment shell 55 by conduits 164. Preferably, this last stage opens a flowpath between a coolant outlet 140 of the reactor (the hot leg of the coolant circuit) and the containment shell 55.

The depressurization valves 82, 92 preferably include a plurality of parallel valve legs 162 coupled between the coolant circuit 62 and spargers 84, submerged in the tank 50, or the containment 55 through conduit 164, coupling progressively larger ones of conduits 162, 164 to vent the pressure, and openable at progressively lower pressures as indicated by the level in the high pressure makeup tank 32.

Spargers for boiling water reactors, intended to reduce pressure in the coolant circuit but not to bring the pressure to the atmospheric pressure in the containment, are typically located about 17 feet underwater, which creates a large back pressure. Additionally, flow resistance causes a further back pressure. The spargers 84 according to the invention are also submerged. However, in addition to venting into the containment 55 through spargers 84, the depressurization system 96 of the invention also vents directly to the containment 55 in the last stage of depressurization.

The first stage, which vents into a sparger 84 from a pressurizer tank 130 coupled to the coolant outlet 140 of the reactor 22, has a relatively small conduit size, and thus reduces initial shock to the coolant circuit 62 when depressurization commences. The subsequent stages use larger conduit sizes. Additionally, it is possible to use a relatively slow opening form of valve 82, 92 to soften the impact of depressurization. Preferably, a first stage valve 82 opens a 4 inch (10 cm) internal diameter conduit 162 and takes approximately 20 seconds to open fully: and the second and third stage valves 82 open 8 inch (20 cm) conduits and take about 90 seconds to open fully. A slow opening form of valve reduces the peak flow rate upon opening of the valve, and thus conserves coolant. With the opening of the valves, and the successive opening of further stages having progressively larger conduit size, there is a slow and gradual increase in coupling between the coolant system 62 being depressurized and the inside of the containment shell 55.

The foregoing conduit sizes are exemplary, preferred for a reactor having a capacity of about 600 MWe. The sizes can be scaled up or down to accommodate other reactor capacities and the like. Similarly, the staging can have a different number of stages than the number of stages shown in connection with the presently preferred embodiment.

The final stage, which in the illustrated embodiment is the fourth stage, vents the coolant circuit 62 directly into the containment 55. Preferably, the fourth stage valve 92 opens a 12 inch (30 cm) conduit 164. This last stage valve or group of valves 92, and the conduit arrangement 164 therefor, are different in several respects from the first three stages. The fourth stage is coupled from the hot leg 140 of the coolant circuit 62 (i.e., the reactor output) directly into the containment shell 55, instead of through the pressurizer tank 130 and/or through underwater spargers 84. Although all the stages are coupled in fluid communication between the containment 55 and the hot leg 140 of the reactor, the stages with smaller conduits and/or which couple through the pressurizer 130 and through the spargers 84 have a characteristic back pressure due to the flow restrictions inherent therein. The fourth or final stage effectively brings the coolant circuit 62 down substantially to the atmospheric pressure existing in the containment shell 55.

The hot leg 140 of the coolant circuit 62 (i.e., the reactor outlet) is the point where the coolant water is hottest in the circuit. Under operational conditions, the water in the hot leg is about 600° F. (330° C.). The water returning from the steam generator 110 along the cold leg 38 is at approximately 550° F. (290° C). Whereas the water is taken off by the depressurization system at its highest temperature, the reactor coolant in more effectively utilized in providing cooling. Both water and steam may be vented. As soon as the first stage opens, the system starts to draw water out of the hot leg 140, into the pressurizer 130, then out of the system and into the containment 55. Although the pressurizer 130 is a rather large tank, even with venting through the spargers 84 the flow through the pressurizer 130 is not sufficient to carry all the contents of the pressurizer 130 through to the refueling water supply tank 50. The water in the pressurizer 130 thus produces a back pressure which limits flow during the first three stages of depressurization. The first three stages thus have back pressure characteristics which the fourth stage does not have. These include the fluid pressure head of the water in the refueling water tank 50 above the spargers 84, the water elevation in the pressurizer 130, and the line flow resistance caused by the relatively smaller size of conduit 162 as compared to the final stage conduit 164.

The depressurization valves for effecting respective stages of depressurization, and/or the operators which are arranged to open the valves, can be chosen with respect to the differential pressure at which the valves are expected to open during depressurization. In particular, the valve and/or operator for the final stage of depressurization is preferably openable only below a predetermined differential pressure, thereby minimizing the possibility that the last stage will be opened prematurely.

Steam and water in the hot leg 140 of the reactor 22, as vented directly in the fourth stage, is carried through a sufficiently large opening defining the hot leg 140 that very little flow resistance occurs between the reactor vessel 46 and the point of venting through the fourth stage conduit 164 and valve 92. Thus the direct connection of the hot leg 140 with the containment 55 in the fourth stage, and the large diameter of the hot leg 140 and fourth stage conduit 164, are such that the pressure in the reactor vessel 46 and the coolant circuit 62 comes substantially fully down to the ambient atmospheric pressure in the containment 55. It is of course the pressure in the reactor vessel 46 which is most important, because the intent of depressurization is to enable water to be drained into the reactor by low pressure means, especially by gravity from the in-containment refueling water storage tank 50.

Preferably, the stages each have a plurality of valves 82, 92 coupled in a series, for example as shown by valves 168. Both valves 168 in the series connection are normally closed. Having two valves in series minimizes leakage and makes it unlikely that any of the stages will be opened or left open inadvertently. Both valves 168 in each stage can be opened via actuation signals from a controller 172. The first three stages can have motor controlled valves 82, powered or geared to achieve the timed opening discussed above. Preferably these valves 82 are powered from batteries. The fourth stage can use a different type of valve to prevent common mode failure and thereby increasing reliability. For example, the fourth valve 92 can be operated pneumatically from a dedicated air cylinder. Alternatively, the fourth stage valve 92 can be explosively operated. For further redundancy, in a reactor having more than one steam generator circuit, a valve and different type of operator can be associated with each of a plurality of hot legs 140 coming out of the reactor vessel 46, again avoiding the possibility of common mode failure.

Where there are two loops in the steam generator portion of the reactor design, the pressurizer 130 and its initial stage valves 82 can be coupled to one hot leg, and the final (e.g., fourth) stage valve 92 can be coupled to the other hot leg. By coupling the initial stages through the pressurizer and the final stage directly, flow is limited during the initial stages, and the pressurizer surge line can be smaller.

Referring to FIGS. 3 and 4, each of the coolant loops is partly enclosed in a coolant loop compartment 175 having concrete walls 177. The fourth stage can open into a respective coolant loop compartment 175. The concrete walls 177 provide shielding for plant personnel, and it is unlikely that plant personnel will be in the area of the coolant loop compartment 175 during plant operations, because radiation levels there are high. One disadvantage, however, is due to the fact that there is some equipment housed in the cooling loop compartment, such as instrumentation coupled to the loops to monitor temperature and flow, and electrical connections for the reactor coolant pumps. Whereas the discharge from the depressurization valve 92 may wet such equipment, some cleanup would be needed before restarting the plant following depressurization.

As an alternative, the fourth stage can be coupled to an outlet at the refueling cavity 181 (see FIGS. 3 and 4). The refueling cavity 181 is a stainless steel lined pit designed to be flooded during refueling operations, and is an advantageous place to direct the output of the fourth stage.

The reduction of pressure through the first three stages can reduce the pressure in the coolant circuit 62 to about 50 psi prior to opening of the fourth stage. The opening of a relatively large conduit 164 to the containment in the fourth stage brings the coolant circuit 62 down to a low pressure, without producing large discharge forces and flow rates. Depending on the extent of boiling still occurring in the reactor vessel 46, some minimal pressure may remain over atmospheric pressure; however, the staged depressurization efficiently reduces the pressure to a point where it is possible to add coolant from a refueling tank at atmospheric pressure. Sufficient water is contained in the refueling water storage tank that its gravity head alone can overcome this remaining pressure.

Another feature of the embodiment shown in the drawings is that the respective valves 82, 92 in each stage can be opened individually and then closed during normal plant operating conditions to verify that the valves 82, 92 are operating properly. As shown in FIG. 2, several small solenoid valves 192 can be provided in test legs 194 leading to the sparger 84, operable to isolate each of the serially coupled valves in the three stages for testing at reduced pressure conditions. Pressure conditions are reduced because the test conduits 196 comprise small (e.g., 0.75 inch or 2.0 cm) internal diameter conduits. Testing at low differential pressure reduces the possibility of causing valve leakage as a result of a test.

For the first three stages, two test valves 192 can isolate and test any of the six valves in the first three stages. A similar arrangement for testing the fourth stage is shown in FIG. 3. In connection with testing of the fourth stage, a test valve arrangement of this type is required for testing, because the fourth stage valves are designed for operation at lower pressures than those typical of plant operation.

The test valves can be used during a cool-down leading to a refueling outage, for conducting a more rigorous test of the automatic depressurization system and its valves. The test can be conducted, for example, at intermediate pressures in the range of 400 to 600 psig. For such a test, the test valves 192 can be arranged such that each tested valve 82 or 92 along the depressurization paths opens under a large differential pressure, by operating selected ones of the test valves 192. For example, the upstream depressurization valve in each pair can be tested by opening the test valve downstream thereof, leading to the spargers 84. The downstream depressurization valve in the pair can by tested by opening the upstream test valve to obtain elevated pressure leading into the depressurization valve. In each case, the small conduit size of the test system limits the flow occurring during the test, and reduces the impact on the downstream refueling water storage tank as well as the atmosphere in the containment, in particular keeping radiation to acceptable levels. Routing the flow to an appropriate drain means apart from the refueling water storage tank 50 is another possibility.

The invention having been disclosed, a number of alternatives will now become apparent to those skilled in the art. The foregoing embodiments are illustrative, and are not intended to limit the particulars of the invention in which exclusive rights are claimed. Reference should be made to the appended claims rather than the discussion of preferred embodiments, in order to assess the scope of the invention in which exclusive rights are claimed.

What is claimed is:

1. A depressurization system for a nuclear reactor having a reactor vessel disposed in a containment shell and inlet and outlet piping coupled to the reactor vessel defining a coolant circuit, the depressurization system comprising:
a plurality of depressurizer valves coupled in fluid communication with the coolant circuit;
at least one sparger in fluid communication with an inside of the containment shell, the sparger being coupled in fluid communication with at least one of said depressurizer valves; and,
means for successively opening the depressurizer valves to effect depressurization, such that coupling between the coolant circuit and the containment shell is increased as pressure in the coolant circuit decreases.

2. The depressurization system according to claim 1, wherein the means for successively opening the depressurizer valves comprises valve controls responsive to a coolant level, operable to open successive ones of the depressurizer valves at progressively lower level setpoints.

3. The depressurization system according to claim 1, further comprising a pressurizer tank disposed in the containment shell, the pressurizer tank having a bottom head coupled to a coolant outlet of the reactor and a top head coupled to at least one of the depressurizer valves.

4. The depressurization system according to claim 1, wherein at least one of the depressurization valves is coupled to an inside of the containment shell through a sparger, said sparger being submerged in a tank of water and the tank of water being vented to the inside of the containment shell.

5. The depressurization system according to claim 4, wherein the tank of water is an in-containment refueling water storage tank, and further comprising means for emptying the tank of water into a sump in the containment shell housing the reactor.

6. The depressurization system according to claim 4, wherein a plurality of the depressurization valves are coupled to the inside of the containment shell through spargers, and a plurality of submerged orifices are vented to the inside of the containment shell.

7. The depressurization system according to claim 6, wherein said plurality of depressurization valves are coupled to the containment shell via conduits which are progressively larger for depressurization valves opening at progressively lower levels, for increasing coupling between the coolant circuit and the containment shell as the level in the coolant circuit decreases.

8. The depressurization system according to claim 7, further comprising means for opening at least one of the depressurization valves over a period of time, whereby a peak flow through said depressurization valves is limited.

9. The depressurization system according to claim 1, wherein at least one said depressurization valve is openable at a lowest pressure and is coupled directly between the coolant circuit and the containment shell.

10. The depressurization system according to claim 9, wherein the at least one depressurization valve openable at the lowest pressure is coupled between a coolant outlet of the reactor and the containment shell.

11. The depressurization system according to claim 4, wherein the plurality of depressurization valves includes a plurality of parallel depressurization valves coupled between the coolant circuit and at least one said sparger submerged in the tank, each of the plurality of parallel depressurization valves being coupled to a progressively larger conduit and openable at progressively lower level, wherein the tank of water is an in-containment refueling water storage tank, and further comprising means for emptying the tank of water into a sump in the containment shell housing the reactor.

12. The depressurization system according to claim 2, wherein the reactor includes a high pressure makeup tank coupled to the coolant circuit, and further comprising means for sensing a level of coolant in the high pressure makeup tank, coupled to the level responsive valve controls for successively opening the depressurizer valves.

13. The depressurization system according to claim 1, wherein at least one of the depressurization valves for effecting a final stage of depressurization is openable only below a predetermined differential pressure.

14. The depressurization system according to claim I, wherein the depressurization valves for at least two of the respective stages are openable using different forms of operators, whereby depressurization can proceed in the event of a common mode failure disabling one form of operator.

15. The depressurization system according to claim 1, further comprising a plurality of test valves coupleable in series with at least some of the depressurization valves, the test valves being coupled along conduits defining restricted flowpaths, whereby the depressurization valves can be tested under conditions characterized by one of limited pressure and limited flow, during operation and shutdown status of the reactor.

16. A nuclear reactor staged depressurization system for reducing operating pressure in a nuclear reactor disposed in a containment shell, comprising:
a coolant circuit coupled to the nuclear reactor via inlet piping and outlet piping, for circulating cooling water through the reactor, the reactor being disposed in the containment shell;
a pressurizer tank disposed in the containment shell and having a bottom head coupled by a conduit to the outlet piping and a top head coupled to a vent conduit;
a refueling water storage tank, open to an inside of the containment shell, and conduit means coupling the refueling water storage tank to the coolant circuit for adding water to the coolant circuit;

a sparger defining at least one orifice submerged in the storage tank, coupled to the vent conduit of the pressurizer tank;

a plurality of depressurization valves coupled in parallel with one another and in series with the vent conduit, the depressurization valves including a first valve operable to open at a first level setpoint and at least one additional valve operable to open at a second level setpoint which is lower than the first level setpoint; and, a last stage depressurization valve coupled between the outlet piping of the reactor and an inside of the containment shell, the last stage depressurization valve being operable to open at a third level setpoint lower than the first and second level setpoints, the last stage depressurization valve discharging cooling water directly from the coolant circuit into the containment shell.

17. The nuclear reactor staged depressurization system according to claim 16, wherein the reactor is disposed in an open sump in the containment shell, and further comprising a valve coupling the open sump in the containment shell to the conduit means coupling the refueling water storage tank to the coolant circuit for adding water to the coolant circuit, whereby water in the containment shell can be added to the reactor from the open sump.

18. The depressurization system according to claim 17, wherein said plurality of depressurization valves are coupled to the containment shell via conduits which are progressively larger for depressurization valves opening at progressively lower levels, for increasing coupling between the coolant circuit and the containment shell as pressure in the coolant circuit decreases.

19. The depressurization system according to claim 16, further comprising a high pressure makeup tank coupled to the coolant circuit, and means for sensing a level of coolant in the high pressure makeup tank, said level setpoints being determined by said means for sensing.

20. The depressurization system according to claim 16, wherein at least one of the depressurization valves for effecting a final stage of depressurization is openable only below a predetermined differential pressure.

21. The depressurization system according to claim 16, wherein the depressurization valves for at least two of the respective stages are openable using different forms of operators, whereby depressurization can proceed in the event of a common mode failure disabling one form of operator.

22. The depressurization system according to claim 16, further comprising a plurality of test valves coupleable in series with at least some of the depressurization valves, the test valves being coupled along conduits defining restricted flowpaths, whereby the depressurization valves can be tested under conditions characterized by one of limited pressure and limited flow, during operation and shutdown status of the reactor.

* * * * *